United States Patent
Hwang et al.

(10) Patent No.: US 8,722,230 B2
(45) Date of Patent: *May 13, 2014

(54) POLYURETHANE BINDER, ELECTRODES CONTAINING THE SAME AND LITHIUM BATTERY EMPLOYING THE ELECTRODES

(75) Inventors: Seung-sik Hwang, Seongnam-si (KR); Jin-hwan Park, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 201 days.

This patent is subject to a terminal disclaimer.

(21) Appl. No.: 11/639,635

(22) Filed: Dec. 14, 2006

(65) Prior Publication Data

US 2007/0178373 A1 Aug. 2, 2007

(30) Foreign Application Priority Data

Jan. 27, 2006 (KR) .................. 10-2006-0009014

(51) Int. Cl.
  *H01M 4/00* (2006.01)

(52) U.S. Cl.
  USPC ........... 429/128; 525/454; 29/623.1; 258/256

(58) Field of Classification Search
  USPC .................................. 525/454
  See application file for complete search history.

(56) References Cited

U.S. PATENT DOCUMENTS

| | | | |
|---|---|---|---|
| 4,028,312 A | 6/1977 | Ball et al. | |
| 4,758,483 A * | 7/1988 | Armand et al. | 429/312 |
| 4,861,826 A | 8/1989 | Hummerich et al. | |
| 5,093,386 A * | 3/1992 | Bishop et al. | 522/96 |
| 5,389,430 A * | 2/1995 | Yilgor et al. | 442/76 |
| 5,798,409 A | 8/1998 | Ho | |
| 5,912,093 A | 6/1999 | Wen et al. | |
| 6,030,421 A * | 2/2000 | Gauthier et al. | 29/623.1 |
| 6,077,897 A | 6/2000 | Wen et al. | |
| 6,322,923 B1 | 11/2001 | Spotnitz et al. | |
| 6,455,606 B1 * | 9/2002 | Kaku et al. | 521/170 |
| 6,576,702 B2 * | 6/2003 | Anderle et al. | 524/591 |
| 2002/0102464 A1 * | 8/2002 | Yoshida et al. | 429/300 |
| 2004/0062989 A1 | 4/2004 | Ueno et al. | |
| 2004/0101753 A1 | 5/2004 | Hwang | |
| 2005/0231894 A1 * | 10/2005 | Yoshida et al. | 361/502 |
| 2006/0235144 A1 * | 10/2006 | Hwang et al. | 524/591 |

FOREIGN PATENT DOCUMENTS

| | | |
|---|---|---|
| CN | 1251596 A | 4/2000 |
| JP | 5-226002 | 9/1993 |
| JP | 5-283103 | 10/1993 |

(Continued)

OTHER PUBLICATIONS

Derwent-Acc-No:1998-203387, Yamaguchi et al., 1998.*

(Continued)

*Primary Examiner* — Shane Fang
(74) *Attorney, Agent, or Firm* — Christie, Parker & Hale, LLP

(57) ABSTRACT

A polyurethane binder prepared by a polyurethane compound having double bonds and by crosslinking the polyurethane compounds. The polyurethane binder having double bonds can be dispersed in water with the dispersant including a reactive group such as a carboxyl group, and thus an organic solvent is not required to produce an electrode. The crosslinked polyurethane binder with a high crosslinking density provides an excellent elastic force and binding force, and thus the electrode and the lithium battery employing the polyurethane binder have improved recovery properties and charge/discharge properties.

19 Claims, 5 Drawing Sheets

(56) References Cited

FOREIGN PATENT DOCUMENTS

| | | |
|---|---|---|
| JP | 6-143819 | 5/1994 |
| JP | 7-117358 | 5/1995 |
| JP | 08-269429 | 10/1996 |
| JP | 10-21927 | 1/1998 |
| JP | 11-001676 | 1/1999 |
| JP | 11-003712 | 1/1999 |
| JP | 11-323300 | 11/1999 |
| JP | 2000-200608 | 7/2000 |
| JP | 2000-265111 | 9/2000 |
| JP | 2002-256129 | 9/2002 |
| JP | 2002-289174 | 10/2002 |
| JP | 2003-123766 | 4/2003 |
| JP | 2003-257491 | 9/2003 |
| JP | 2003-331848 | 11/2003 |
| JP | 2004-256694 | 9/2004 |
| JP | 2005-044681 | 2/2005 |
| JP | 2006-169503 | 6/2006 |
| JP | 2006-172992 | 6/2006 |
| KR | 1999-025437 | 4/1999 |
| KR | 10-2004-0046139 | 6/2004 |
| KR | 10-2004-0067030 | 7/2004 |
| KR | 10-2004-0078927 | 9/2004 |
| KR | 10-2004-0104400 | 12/2004 |
| KR | 10-2005-0038254 | 4/2005 |
| KR | 10-2006-0055669 | 5/2006 |
| WO | WO 33406 A1 * | 6/2000 ............ H01M 6/18 |
| WO | WO 00/56797 | 9/2000 |
| WO | WO 2004/079841 | 9/2004 |
| WO | WO 2004/107481 | 12/2004 |
| WO | WO 2005/101554 A1 | 10/2005 |

OTHER PUBLICATIONS

Korean Patents Abstracts, Publication No. 1020040078927, Published on Sep. 14, 2004, in the name of Han, et al.

Korean Patents Abstracts, Publication No. 1020040104400, Published Dec. 10, 2004, in the name of Han, et al.

China Office action dated May 9, 2008 for China application 2006100736453, with English translation indicating relevance of Japan reference.

Korea Office action dated Jun. 27, 2007 for Korea application 10-2005-0060949, with English translation indicating relevance of Korean.

Patent Abstracts of Japan, Publication No. 08-269429, dated Oct. 15, 1996, in the name of Shiyuki Ogushi et al.

Korean Patent Abstracts, Publication No. 100249728, dated Dec. 28, 1999, for Korean publication 1999-025437.

USPTO Office Action dated Mar. 30, 2009, for U.S. Appl. No. 11/404,943.

Chinese Office action dated Jun. 19, 2009, for corresponding Chinese application 2006101593029, with English translation, as well as U.S. Patents previously cited in a U.S. Office action dated Sep. 9, 2008.

U.S. Office action dated Nov. 4, 2009, for related U.S. Appl. 11/404,943.

Japanese Office action dated Jan. 25, 2011, for corresponding Japanese Patent application 2007-016916, 2011.

English machine translation of Japanese Publication 11-323300, 32 pages, 1999.

English machine translation of Japanese Publication 2004-256694, 41 pages, 2004.

KIPO Registration Determination Certificate dated Dec. 26, 2007, for Korean Patent application 10-2005-0030949, 4 pages.

Office action dated Jun. 17, 2011 in cross-referenced U.S. Appl. No. 11/404,943; 11 pages.

Advisory action dated Aug. 29, 2011 in cross-referenced U.S. Appl. No. 11/404,943; 3 pages.

Japan Office action dated Sep. 8, 2009, for Japanese Patent application No. 2006-105389.

U.S. Office action dated May 17, 2010, for related U.S. Appl. No. 11/404,943.

KIPO Registration Determination Certificate dated Nov. 19, 2007, for Korean priority Patent application 10-2006-0009014, 4 pages.

Japanese Office action dated Jun. 15, 2010, for corresponding Japanese Patent application 2007-016916.

U.S. Office action dated Oct. 17, 2012, issued to U.S. Appl. No. 11/404,943 (12 pages).

U.S. Office action dated Mar. 13, 2013, issued to U.S. Appl. No. 11/404,943 (7 pages).

U.S. Office action dated Aug. 1, 2013, issued to U.S. Appl. No. 11/404,943 (9 pages).

U.S. Office action dated Nov. 29, 2013, issued to U.S. Appl. No. 11/404,943 (8 pages).

Abstract for JP Publication No. 63015816, dated Jan. 22, 1988, to Takegawa et al.; DERWENT-ACC No: 1988-060389 (4 pages).

* cited by examiner

POLYURETHANE BINDER, ELECTRODES CONTAINING THE SAME AND LITHIUM BATTERY EMPLOYING THE ELECTRODES

CROSS-REFERENCE TO RELATED PATENT APPLICATION

This application claims priority to and the benefit of Korean Patent Application No. 10-2006-0009014, filed on Jan. 27, 2006, in the Korean Intellectual Property Office, the disclosure of which is incorporated herein in its entirety by reference.

BACKGROUND OF THE INVENTION

1. Field of the Invention

The present invention relates to a polyurethane binder, electrodes containing the same and a lithium battery employing the electrodes.

2. Description of the Related Art

Lithium batteries have high voltages and high energy densities, and have enhanced stability compared other batteries, such as a Ni—Cd batteries. Due to these advantages, lithium batteries are used as a power source for portable electronic devices. However, since smaller and lightweight portable electric applications become increasingly popular, a battery having a higher operating voltage, longer lifetime, and higher energy density than a conventional lithium battery is desired.

Properties of batteries are dependent on electrodes, electrolytes, and other battery materials included therein. Particularly, properties of electrodes are dependent on electrode active materials, current collectors, and binders that provide a binding force between electrode active materials and current collectors.

A polyvinylidene fluoride (PVDF) based polymer used as a binder material is dissolved in an organic solvent such as N-methyl-2-pyrrolidone when used. The PVDF based polymer has a strong binding force. However, elongation of the PVDF based polymer is very small at about 10%, and thus a large amount of the PVDF based polymer is used to obtain a sufficient binding force thereby limiting the miniaturization. In addition, the PVDF based polymer is dissolved in an organic solvent before use, thereby complicating the manufacturing process. A styrene-butadiene rubber (SBR) used as a binder material has an excellent elastic capacity. However, a binding force of the SBR is very weak such that, after a number of charging/discharging cycles, the structure of an electrode is changed and the capacity and lifetime of a battery including such an electrode is reduced.

SUMMARY OF THE INVENTION

One embodiment of the present invention provides a waterborne polyurethane binder having an excellent elastic properties and binding forces.

Another embodiment of the present invention also provides a polyurethane binder prepared by crosslinking the waterborne polyurethane binder having improved elastic and recovery properties.

An embodiment of the present invention also provides an electrode prepared using the polyurethane binder.

A further embodiment of the present invention also provides a lithium battery employing the electrode.

According to an embodiment of the present invention, a polyurethane binder prepared from a polyurethane resin having double bonds is provided.

According to another embodiment of the present invention, a polyurethane binder prepared by crosslinking the polyurethane binder using a crosslinking agent or a water-soluble initiator is provided.

According to a further embodiment of the present invention, an electrode including the polyurethane binder is provided.

According to yet another embodiment of the present invention, a lithium battery employing the electrode is provided.

A polyurethane binder prepared from a polyurethane compound having double bonds according to an embodiment of the present invention can be dispersed in water because it includes dispersants chemically bonded to itself, and thus an organic solvent is not required in producing an electrode. Therefore, the manufacturing process for the electrode is inexpensive and environmentally friendly. The polyurethane binder crosslinked by the crosslinking agent or the water-soluble initiator provides a excellent elastic forces and recovery properties with a high crosslinkage density, and thus the electrode and the lithium battery employing the polyurethane binder have improved charge/discharge properties.

BRIEF DESCRIPTION OF THE DRAWINGS

The above and other embodiments of the present invention will become more apparent by describing in detail exemplary embodiments thereof with reference to the attached drawings in which.

DETAILED DESCRIPTION OF THE INVENTION

Figure 1:
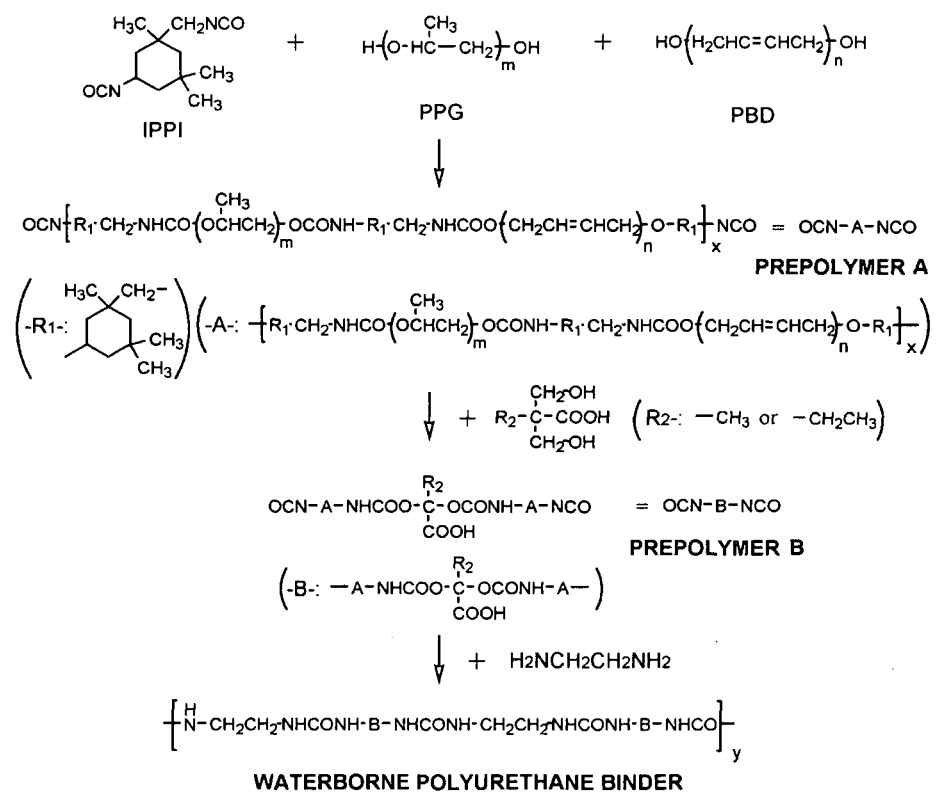
FIG. 1 illustrates a process of manufacturing a polyurethane binder according to an embodiment of the present invention.

A polyurethane binder prepared from a polyurethane compound having double bonds of an embodiment of the present invention binds active materials in energy storage devices such as lithium batteries.

In one embodiment, the polyurethane binder is prepared by reacting a neutralizer and a chain extender with a polyurethane compound obtained by reacting a polyol compound having double bonds, a diisocyanate compound, and a dispersant.

The polyol is used for crosslinking polyurethane molecules in a polyurethane compound. In one embodiment, the polyol has a weight average molecular weight (Mw) in the range of 200 to 10,000, and more preferably 1,000 to 6,000 for the reaction efficiency. When the Mw of the polyol compound is less than 200, properties of the polyurethane binder ultimately prepared may deteriorate. On the other hand, when the Mw of the polyol compound is greater than 10,000, the reactivity decreases or the viscosity of the polyurethane compound is too high, and thus the handling of the polyurethane compound is difficult.

Examples of the polyol compound having double bonds may include polybutadiene including hydroxyl groups at both ends, but are not limited thereto. The polyol having double bonds may include at least one compound of polyethyleneglycol acrylate having a hydroxyl group at one end and polyethyleneglycol methacrylate having a hydroxyl group at one end.

The polyol compound of an embodiment of the present invention may include a polyol moiety without double bonds. In one embodiment, the Mw of a polyol moiety without double bonds may be in the range of 200 to 10,000, more preferably 500 to 8,000, and most preferably 1,000 to 5,000. When the Mw of the polyol without double bonds is less than 200, properties of the polyurethane binder resin which will be prepared may deteriorate. On the other hand, when the Mw of the polyol without double bonds is greater than 10,000, the reactivity decreases or the viscosity of the polyurethane compound is too high, and thus the handling of the polyurethane compound is difficult.

Examples of the polyol moiety without double bonds may be formed from at least one of polyethyleneglycol, polypropyleneglycol, ethyleneglycol/propyleneglycol copolymer, polytetramethyleneetherglycol, polycaprolactonediol, polybutadienediol ethyleneglycol, 1,2-propyleneglycol, 1,3-propyleneglycol, 1,3-butanediol, 1,4-butanediol, 1,5-pentanediol, 1,6-hexanediol, 2,2-dimethyl-1,3-propanediol, diethyleneglycol, dipropyleneglycol, 1,4-cyclohexanedimethanol, p-xylylenediol, phenyldiethanolamine, methyldiethanolamine, and 3,9-bis(2-hydroxy-1,1-dimethyl)-2,4,8,10-tetraoxaspiro[5,5]-undecane, but the polyol moiety is not limited thereto. In one embodiment the polyol compound may include three hydroxyl groups or more. When needed, monohydric alcohol such as methanol, ethanol, butanol, ethyleneglycol monoethylether, diethyleneglycol monoethylether, or the like can further be used in the reaction. Additionally, in an embodiment, polymer monohydric alcohols such as polyethyleneglycol monoethylether, polypropyleneglycol monoethylether, ethyleneglycolpropyleneglycol copolymer monoethylether which are substituted compounds of polyethyleneglycol, polypropyleneglycol, ethyleneglycolpropyleneglycol copolymer by substituting one end with a methyl or ethyl group, may be used.

In one embodiment, the diisocyanate compound may be any compound having at least two isocyanate groups, such as alicyclic isocyanate, aliphatic isocyanate, or aromatic isocyanate. Examples of the diisocyanate compound may include at least one compound of methylenediphenyldiisocyanate (MDI), polymeric methylenediphenyldiisocyanate (PMDI), tolylenediisocyanate (TDI), lysinediisocyanate (LDI), hydrogenated tolylenediisocyanate, hexamethylenediisocyanate (HDI), xylenediisocyanate (XDI), hydrogenated xylenediisocyanate, naphthalenediisocyanate (NDI), biphenylenediisocyanate, 2,4,6-triisopropylphenyldiisocyanate (TIDI), diphenyletherdiisocyanate, tolidinediisocyanate (TODI), isophoronediisocyanate (IPDI), 4,4'-dicyclohexylmethanediisocyanate (HMDI), tetramethylxylenediisocyanate (TMXDI), 2,2,4-trimethyl hexamethylenediisocyanate (TMHDI), 1,12-diisocyanatododecan (DDI), norbornanediisocyanate (NBDI), 2,4-bis-(8-isocynatooctyl)-1,3-dioctylcyclobutane (OCDI), 2,2,4(2,4,4)-trimethyl hexamethylenediisocyanate (TMDI), and naphthalene-crosslinked polyphenyl polyisocyanate, but the diisocyanate compound is not limited thereto.

The dispersant provides a water dispersion property to the polyurethane binder. The dispersant according to one embodiment may have two hydroxyl groups and at least one group capable of decomposing into a cation or an anion, for example a carboxyl group. Examples of the dispersant may include at least one of the following compounds including dimethylol butanoic acid (DMBA), dimethylol propionic acid (DMPA), methylene diethanol amine, and polyethylene oxide derivative, but the dispersant is not limited thereto. In an embodiment, the amount of the dispersant may be in the range of 2 to 7% by weight based on the total weight of the polyurethane binder resin. When the amount of the dispersant is less than 2% by weight, the dispersion stability of the polymer decreases. When the amount of the dispersant is greater than 7% by weight, the polarity of the polyurethane polymer compound increases due to the use of the excessive amount of the dispersant, which deteriorates the water resistance and chemical resistance of the polyurethane polymer compound.

In one embodiment, the two hydroxyl groups of the dispersant are chemically bound to the isocyanate group of the polyurethane compound to form a urea group.

In an embodiment, the polyurethane bound to a carboxyl-based dispersant such as dimethylol butanoic acid (DMBA), can be neutralized using a base compound or a cationic metal. The carboxyl group is chemically neutralized using the base compound or the cationic metal to form a salt, and thus the polyurethane compound is dispersible in water. The base compound may be triethylamine (TEA), sodium hydroxide (NaOH), potassium hydroxide (KOH), or the like, but is not limited thereto.

The chain extender of an embodiment of the present invention provides an elastic force to the polymer resin by increasing the molecular weight of the polyurethane and forming hard segment in the backbone of the polymer. The chain extender may be a diamine based compound or triamine based compound having a relatively small molecular weight, for example having 2 to 6 carbon atoms. Such a chain extender may include at least one of the following compounds including ethylenediamine, butylenediamine, propanediamine, hexanediamine, isophoronediamine, xylenediamine, diethyltoluenediamine, diethylenetriamine, and triethylenetetraamine, but is not limited therto.

A method of preparing the polyurethane binder of an embodiment of the present invention is illustrated in FIG. 1. Referring to FIG. 1, a prepolymer A having urethane groups is prepared by reacting isophoronediisocyanate (IPDI) as a diisocyanate compound, polypropyleneglycol (PPG) as a polyol compound without double bonds, and polybutadiene (PBD) as a polyol with double bond having hydroxyl groups at both ends. Then, a prepolymer B is prepared by reacting the prepolymer A with dimethylol butanoic acid (DMBA). The prepolymer B is reacted with ethylenediamine (EDA) as a chain extender to prepare a polyurethane binder containing urea groups.

The reaction conditions for each stage of the present invention are not particularly restricted as long as they are commonly used in the art, and are not intended to limit the scope of the invention. The method of preparing the polyurethane binder of an embodiment of the present invention will now be described in more detail. First, an excess amount of a diisocyanate compound is reacted with a polyol compound having double bounds to prepare a prepolymer A. In an embodiment, the equivalent ratio of the diisocyanate compound to the polyol compound may be in the range of 1.01:1 to 4:1, more preferably 1.1:1 to 2:1, and most preferably 2:1. When the upper limit of the diisocyanate compound is greater than 4 or the lower limit of the diisocyanate compound is less than 1.01, a high molecular weight polymer cannot be obtained. The prepolymer A is reacted with a dispersant to prepare a polyurethane prepolymer B. Then, the polyurethane prepolymer B is transformed into a salt using a neutralizer, and the resulting salt is dispersed in water to prepare a waterborne polyurethane prepolymer B. At this point, 15 to 60% by weight of the waterborne prepolymer B may be solid. The waterborne prepolymer B is reacted with a chain extender to obtain a polyurethane binder. The chain extender provides mechanical properties to the polyurethane compound. In an embodiment, the amount of the chain extender is determined such that an equivalent ratio of a residual cyan group of the waterborne polyurethane compound unreacted in the process described above to the chain extender is about 1:1. When there is too much or too little of the chain extender, the molecular weight of the polyurethane does not sufficiently increase, and thus unique properties of the polyurethane are not realized. According to an embodiment of the present invention, the above processes may be performed under a nitrogen atmosphere at a temperature of about 40 to 90° C. for about 1 to 8 hours, and more preferably at about 60 to 80° C. for about 5 to 6 hours, and are not exposed to air to prepare the polyurethane binder.

The polyurethane binder according to an embodiment of the present invention has a structure including at least one double bond and reactive group side chains such as carboxyl groups.

The polyurethane binder prepared by the polyurethane compound having double bonds has an excellent binding force and elastic properties. In an embodiment, the polyurethane binder has reactive group side chains such as carboxyl groups, forms a salt using a neutralizer and thus can be dispersed in water. Therefore, an organic solvent is not required in manufacturing an electrode using the polyurethane binder, and thus the manufacturing process is environmentally friendly.

The polyurethane binder of an embodiment of the present invention is crosslinked by a crosslinking agent or a water-soluble initiator. The polyurethane binder contains a reactive group such as a carboxyl group on the side chains and double bonds, and thus can be easily crosslinked.

The crosslinking agent can be used for the reaction with the side chains of the polymer, and the water-soluble initiator can be used for the reaction with the double bonds since the polyurethane is waterborne.

In one embodiment, the crosslinking agent may be at least one of the following compounds including aziridine, oxazoline, denaturated diisocyanate, and diepoxide which have two or more reactive groups. The crosslinking agent does not need to be a single molecule and can be an oligomer formed of at least two molecules connected together. Examples of the crosslinking agent may include trimethylolpropane tris(2-methyl-1-aziridinepropionate), and EPOCROS, POLYMENT, CHEMITITE of Shokubai Inc., Japan, but are not limited thereto.

Figure 2:
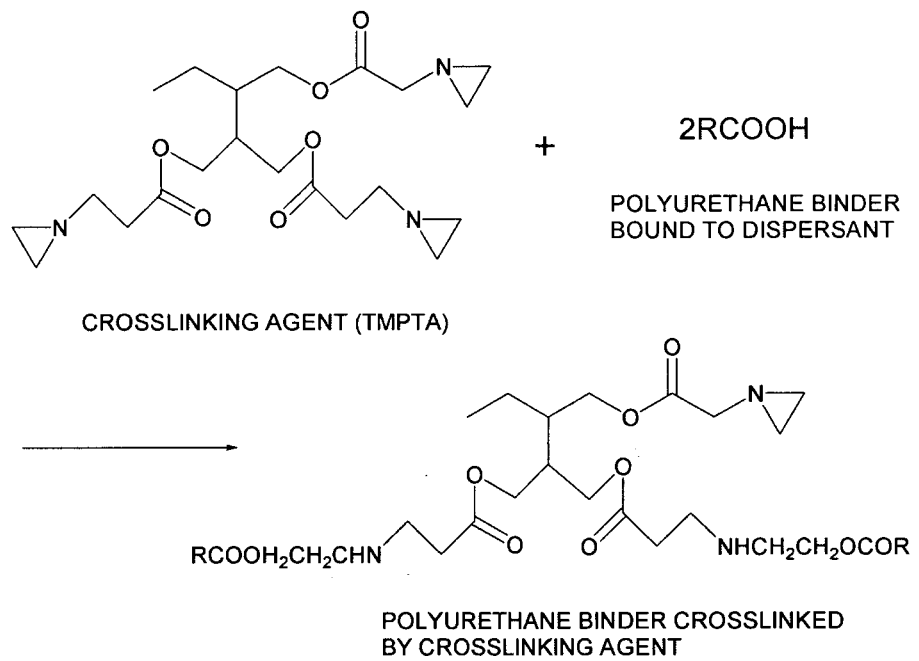
FIG. 2 illustrates a process of forming a crosslinked polyurethane binder by a crosslinking agent according to an embodiment of the present invention.

A method of manufacturing the polyurethane binder using the crosslinking agent according to an embodiment of the present invention is illustrated in FIG. 2. FIG. 2 shows a polyurethane crosslinking using trimethylolpropanetris(2-methyl-1-aziridinepropionate (TMPTA) which is an aziridine compound, as a crosslinking agent. Referring to FIG. 2, the carboxyl group in the polyurethane binder is activated by TMPTA, bound to one end of the crosslinking agent, thereby forming a crosslinkage.

The conditions for the crosslinking reaction of the present invention are not particularly restricted and include those commonly used in the art.

The water-soluble initiator used for crosslinking the double bonds of the polyurethane may be any water-soluble initiator. Examples of the water-soluble initiator may include at least one of the following compounds including ammonium persulfate (AMS), potassium persulfate (KPS), 4,4-azobis(4-cyano valeric acid), 2,2-azobis(2-amidopropane) dihydrochloride, 2,2-azobis[2-(5-methyl-2-imidazoline-2-il) propane]dihydrochloride, 2,2-azobis[2-(2-imidazoline-2-il) propane], 2,2-azobis[2-(2-imidazoline-2-il)propane]dihydrochloride, 2,2-azobis[N-(2-carboxyethyl)-2-methyl-propioamide, 2,2-azobis[2-(3,4,5,6-tetrahydropyrimidine-2-il)propane]dihydrochloride, 2,2-azobis{2-[1-(2-hydroethyl)-2-il]propane}dihydrochloride, 2,2-azobis[2-(2-imidazoline-2-il)propane], 2,2-azobis{2-methyl-N-[1,1-bis(hydroxymethyl)2-hydroxyethyl]propioamide, 2,2-azobis{2-methyl-N-[2-(hydroxybutyl)]propioamide and 2,2-azobis[2-methyl-N-[2-(hydroxyethyl)propioamide], but are not limited thereto.

The crosslinking between the double bonds in the polyurethane according to an embodiment of the present invention can be performed using methods commonly used in the art and are not intended to limit the scope of the invention.

Figure 3:
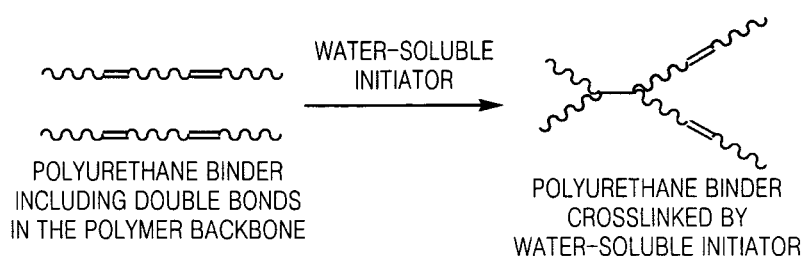
FIG. 3 illustrates a process of forming a crosslinked polyurethane binder by a water-soluble initiator according to an embodiment of the present invention.

A method of manufacturing the polyurethane binder that has been crosslinked using the water-soluble initiator according to an embodiment of the present invention is schematically illustrated in FIG. 3. Referring to FIG. 3, the double bond is activated by the water-soluble initiator and crosslinked with an adjacent polyurethane.

The polyurethane binder crosslinked using the crosslinking agent or the water-soluble initiator has a high crosslinking density thereby providing improved elastic properties. Therefore, an electrode including the polyurethane binder resin can retain its original volume and its original binding force despite substantial volume changes occurring during charging and discharging. Therefore, a battery using the electrode exhibits better performance.

A method of producing an electrode including the polyurethane binder resin according to an embodiment of the present invention will now be described in more detail. The electrode includes an anode and a cathode and further includes the polyurethane binder and electrode active materials.

The waterborne polyurethane binder according to an embodiment of the present invention is used for the polyurethane binder of the electrode. That is, the waterborne polyurethane binders having double bonds are bound to the dispersant or crosslinked to each other by the crosslinking agent or the water-soluble initiator. The active materials are not particularly restricted and may be those that are commonly used in the art.

A method of producing the cathode and anode of the electrode will now be described in more detail.

First, to produce an anode using the waterborne polyurethane binder or crosslinked polyurethane binder according to an embodiment of the present invention, an anode material composition including the waterborne polyurethane binder resin, and an anode active material are molded into a shape. Alternatively, the anode material composition can be coated on a current collector, such as a copper film.

Particularly, an anode material composition is prepared, and the prepared anode material composition is directly coated onto a laminated copper current collector to produce an anode plate. Alternatively, the prepared anode material composition is cast on a separate support and then separated from the separate support. The anode active material film separated from the separate support is laminated on a copper current collector, thereby producing an anode plate. The structure of the anode of the present invention is not limited thereto, and any structure can be used for the anode.

Generally, when a battery has high capacitance, the battery is charged and discharged with a large current. For this purpose, an electrode is formed of a material having lower resistance, and thus it is common to use a conductive agent to decrease the resistance of the electrode. However, the anode according to one embodiment is conductive, and thus use of an additional conductive agent is not necessary. When the anode active material is carbon/silicon based active material having low conductivity, a conductive agent can be added. In one embodiment, the conductive agent can be carbon black or graphite, but is not limited thereto.

To produce a cathode using the waterborne polyurethane binder according to an embodiment of the present invention, a cathode active composition is prepared by mixing a cathode active material, a conductive agent, the waterborne polyurethane binder resin, and a solvent. Then, the cathode active composition is directly coated on a metallic current collector and dried to prepare the cathode plate. Alternatively, the cathode active composition can be cast on a separate support and then separated from the separate support. The film separated from the separate support is laminated on a metallic current collector, thereby producing a cathode plate.

The cathode active material can be a lithium containing metal oxide. For example, in one embodiment, the cathode active material can be $LiCoO_2$, $LiMn_xO_{2x}$, $LiNi_{1-x}Mn_xO_{2x}$ where x=1 or 2, $Ni_{1-x-y}Co_xMn_yO_2$ where $0 \leq x \leq 0.5$, $0 \leq y \leq 0.5$, or the like. More particularly, the cathode active material can be a compound of which lithium can be oxidized or reduced, such as $LiMn_2O_4$, $LiCoO_2$, $LiNiO_2$, $LiFeO_2$, $V_2O_5$, TiS, MoS, or the like.

In the cathode, the conductive agent of the cathode is carbon black, the binder is the waterborne polyurethane binder resin according to an embodiment of the present invention, and the solvent is water. Amounts of the cathode active material, the conductive agent, the binder, and the solvent can be those commonly used in the related art.

To produce an electrode including the waterborne polyurethane binder resin crosslinked by the crosslinking agent according to an embodiment of the present invention, a waterborne polyurethane binder resin which is not crosslinked, an active material, and a crosslinking agent are simultaneously mixed to prepare an electrode slurry, which is then coated on a current collector before a crosslinking reaction between the waterborne polyurethane binder and the crosslinking agent occurs. As a result, an electrode is produced. In one embodiment, the crosslinking reaction is performed in a mixed state with the electrode active material, and thus the binder can be uniformly distributed in the electrode so that the properties of the electrode are uniform throughout the electrode. The crosslinking agent can be simultaneously mixed with the waterborne polyurethane compound and the electrode active material as described above, or the crosslinking agent can be mixed with a mixture of other slurry forming components before being coated on the current collector.

A lithium battery according to an embodiment of the present invention includes the electrode described above as either a cathode or an anode or as both a cathode and an anode. The lithium battery may also include a polymer electrolyte layer including the polymer electrolyte composition as a separate composition. The polymer electrolyte may be any compound commonly used in the art.

The separator can be any separator that is commonly used in a lithium battery. In particular, the separator may have a low resistance to the flow of ions and an excellent electrolyte retention capability. In one embodiment, the separator may be glass fiber, polyester, teflon, polyethylene, polypropylene, polytetrafluroethylene (PTFE), or combinations thereof, which may or may not be woven. Particularly, a lithium ion battery includes a rollable separator formed of polyethylene, polypropylene, or the like. A lithium ion polymer battery has a separator having an excellent organic electrolyte retention capability. A method of preparing such a separator will now be described.

A separator composition is prepared by mixing a polymer resin, a filling agent, and a solvent. The separator composition is directly coated on an electrode and then dried to prepare a separator film. Alternatively, the separator composition is cast on a support and then dried. The separator film is separated from the support and laminated on an electrode.

The polymer resin is not limited, and can be any material that is used in a binding agent on an electrode. In one embodiment, the polymer resin may be vinylidene fluoride/hexafluoropropylene copolymer, polyvinylidene fluoride, poly acrylonitrile, polymethyl metacrylate, or a mixture thereof.

An electrolyte solution according to one embodiment may be prepared by dissolving at least one or two electrolytes including a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where x and y are natural numbers, LiCl, LiI, or the like in a solvent, such as polypropylene carbonate, ethylene carbonate, diethyl carbonate, ethyl methyl carbonate, methylpropyl carbonate, butylene carbonate, benzonitrile, acetonitrile, tetrahydrofurane, 2-methyltetrahydrofuran, γ-butyrolactone, dioxolane, 4-methyldioxolane, N,N-dimethylformamide, dimethylacetamide, dimethylsulfuroxide, dioxane, 1,2-dimethoxyethane, sulfuran, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, dimethylether, and combinations thereof, or the like.

The separator is interposed between the cathode plate and the anode plate describe above, thereby forming a battery assembly structure. The battery assembly structure is wound or folded and loaded into a cylindrical or rectangular battery case, and then the organic electrolyte solution according to an embodiment of the present invention is injected into the battery case. As a result, a lithium ion battery according to an embodiment of the present invention is produced.

Figure 7:
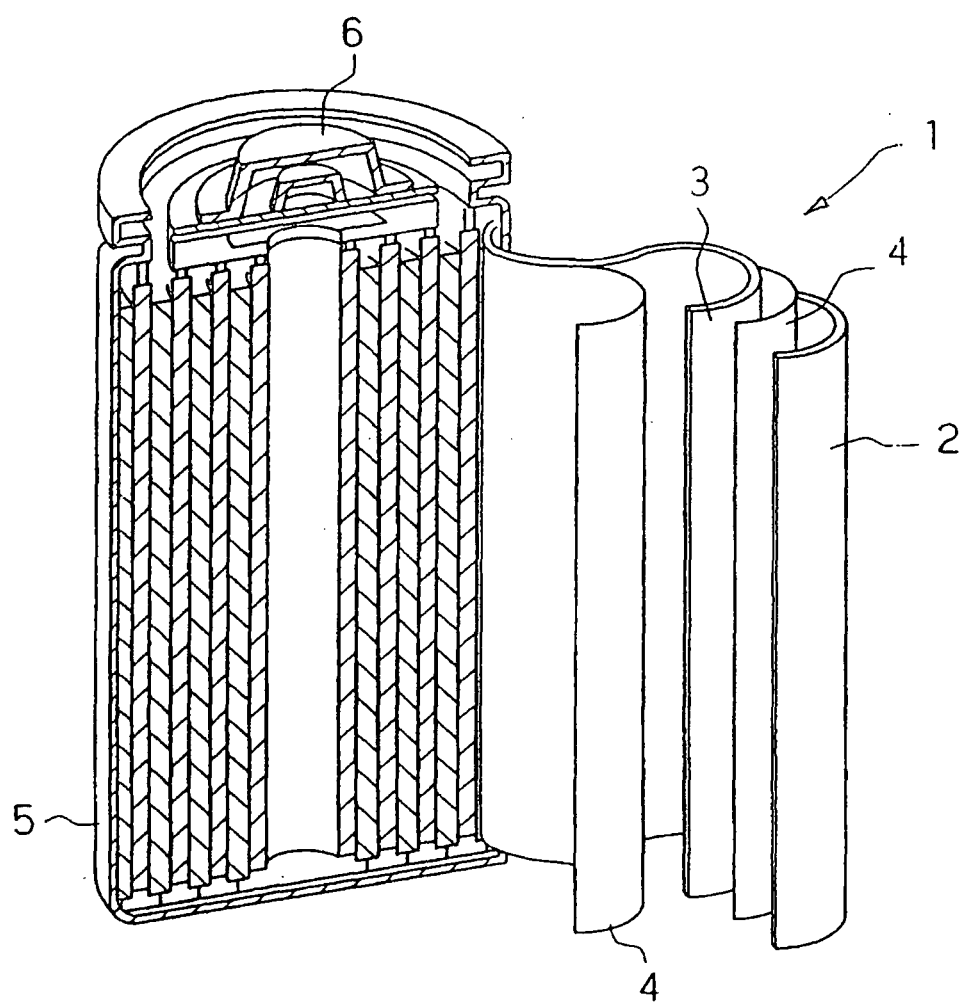
FIG. 7 illustrates a battery utilizing an electrode according to one embodiment of the present invention.

In an embodiment of the present invention, a lithium battery is provided which includes the electrode described above. As shown in FIG. 7, the lithium battery 1 comprises an anode 2, a cathode 3 and a separator 4 positioned between the anode 2 and cathode 3. The anode 2, cathode 3 and separator 4 are wound together to form an electrode assembly. The electrode assembly is enclosed within a battery case 5 with an electrolyte, and is sealed with a cap assembly 6.

Alternatively, the battery assembly structure can be used to produce a bicell structure and then immersed in an organic electrolyte solution. The resulting product is sealed in a pouch to produce a lithium ion polymer battery.

A polyurethane binder having double bonds according to an embodiment of the present invention can be dispersed in water with the dispersant including a carboxyl group, and thus an organic solvent is not required to produce an electrode. In one embodiment, the polyurethane binder crosslinked by the crosslinking agent or the water-soluble initiator has a high crosslinking density thereby providing a excellent elastic force and recovery properties. Therefore, the electrode employing the polyurethane binder has improved charge/discharge properties and the lithium battery employing the electrode has longer life.

The present invention will be described in further detail with reference to the following examples. These examples are for illustrative purposes only and are not intended to limit the scope of the present invention.

EXAMPLES

Preparation of Polyurethane Binder

Preparation Example 1 (PBD-B-6)

99.59 g of isophoronediisocyanate (IPDI) and 17.7 g of dimethylol butanoic acid (DMBA) were loaded into a 1 L four-neck round-bottom reactor and slowly stirred under a nitrogen atmosphere. 53.0 g of polypropyleneglycol (PPG, Mw=1,000) and 106.0 g of polybutadiene (Mw=2,000) having hydroxyl groups at both ends were added thereto at about 40° C. Then, after the temperature was stabilized, the IPDI, the DMBA, and the PPG were reacted at 60° C. for 4-6 hours until a theoretical NCO value corresponding to a state where ends of the polyol are connected by IPDI was obtained. Then, the temperature was cooled to 30° C. and then 7.53 g of triethylamine (TEA) corresponding to the same number of moles as the DMBA, was added thereto and a neutralization reaction was performed by stirring at 40° C. for 30 minutes. After the neutralization, the temperature was cooled to 20° C. or less. 375 g of distilled water, which was 50 g less than the 425 g of distilled water, was added to the neutralization product, and stirred at a rate of 1000 rpm until dispersion of the neutralization product was stabilized. Then, 7.2 g of ethylenediamine (EDA), which was required to extend a chain, was dissolved in 30 g of distilled water and slowly added to the reactor. When the EDA was added, a large amount of heat was generated and the temperature of the reactor increased to 40° C. or higher. After the temperature was stabilized at 60° C., the chain extending reaction was performed for about 3 hours to prepare a waterborne polyurethane solution having 20 wt % solid contents.

Preparation Example 2 (PBD-B-6/Az)

0.2 g of trimethylpropane tris(2-methyl-1-aziridinepropionate) (TMPTA) which is a crosslinking agent, was added into and dissolved in 100 g of the waterborne polyurethane binder solution prepared according to Preparation Example 1 to prepare a waterborne polyurethane binder solution.

Preparation Example 3 (PBD-B-6/APS)

0.1 g of ammonium persulfate (APS) which is a water-soluble initiator, was added into and dissolved in 100 g of the waterborne polyurethane binder solution prepared according to Preparation Example 1 to prepare a waterborne polyurethane binder solution.

Preparation Example 4 (PBP-B-6/APS+Az)

0.1 g of APS and 0.2 g of TMPTA were added into and dissolved in 100 g of the waterborne polyurethane binder solution prepared according to Preparation Example 1 to prepare a waterborne polyurethane binder solution.

Comparative Example 1 (SBR)

Styrene butadiene rubber (SBR) (BM400B, produced from ZEON Inc., Japan), which is commercially available, was used.

Stress-Strain Experiment

A stress-strain test was performed on a film prepared using the polyurethane binder obtained according to Preparation Examples 1 through 4. The polyurethane binder solution prepared according to Preparation Examples 1 through 4 was loaded into a Teflon mold and water was evaporated, and then the residual water was completely removed by drying in a vacuum at 100° C. for 4 hours to prepare the film. The polyurethane binder prepared according to Preparation Examples 2 through 4 was crosslinked during the vacuum drying process. The stress-strain test was performed using a universal Testing Machine AMETEK produced by LLOYD Inc. The strain speed was 500 mm/min, and the results are shown in FIG. 4.

Figure 4:
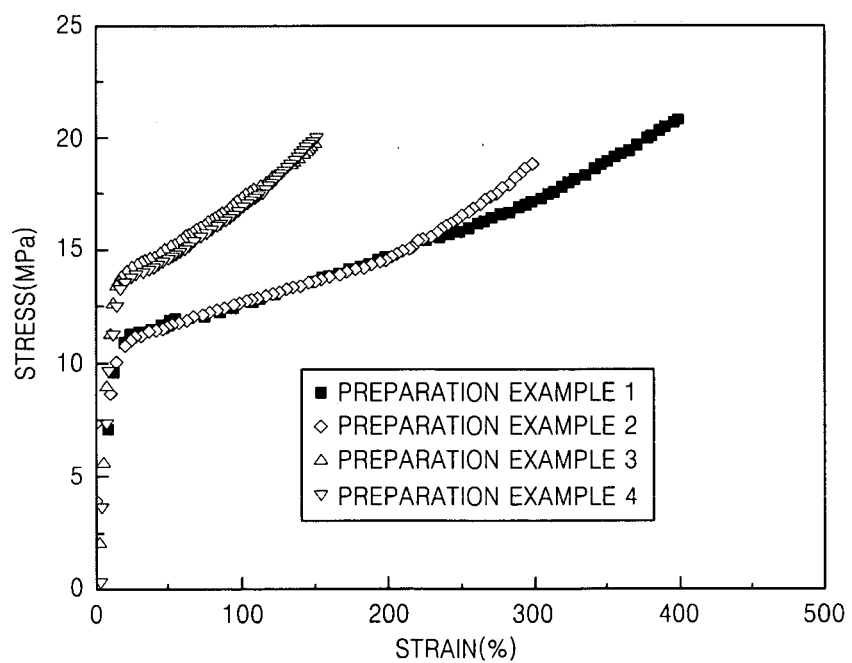
FIG. 4 is a graph of stress vs. strain of polyurethane binder films prepared according to Preparation Examples 1 to 4.

As illustrated in FIG. 4, the film prepared from the crosslinked polyurethane binder has stronger stress than the film prepared form the polyurethane binder which is not crosslinked. Particularly, when the polyurethane binder was crosslinked by an initiator as described in Preparation Examples 3 and 4, the film has a great modulus.

Preparation of Anode

Example 1

1.5 g of the polyurethane binder prepared according to Preparation Example 1 was mixed with 1.5 g of carboxylmethyl cellulose (CMC). 200 g of distilled water, 20 g of a conductive agent (SFG6, graphite based conductive agent produced by Timcal Inc.), 77 g of an anode active material (a composite active material formed of graphite, silicon metal, and carbon, produced by Osaka Gas Chemical Inc.) were mixed together and then stirred for 60 minutes by a mechanical stirrer to prepare a slurry.

The slurry was coated to a thickness of about 60 to 70 μm on a Cu current collector using a doctor blade, and then dried. The dried product was dried again at 120° C. in a vacuum to prepare an anode plate.

Example 2

An anode plate was prepared according to Example 1, except that 1.5 g of PBD-B-6/Az prepared according to Preparation Example 2 was used as a polyurethane binder.

Example 3

An anode plate was prepared according to Example 1, except that 1.5 g of PBD-B-6/APS prepared according to Preparation Example 3 was used as a polyurethane binder.

Example 4

An anode plate was prepared according to Example 1, except that 1.5 g of PBD-B-6/APS+Az prepared according to Preparation Example 4 was used as a polyurethane binder.

Comparative Example 2

An anode plate was prepared in the same manner as in Example 1, except that styrene-butadiene rubber (SBR) was used instead of the polyurethane binder.

Preparation of Lithium Battery

The respective anode plates prepared according to Examples 1 through 4 and Comparative Example 2, a lithium metal as a counter electrode, a PE separator, and an electrolyte (1.3 M LiPF$_6$ dissolved in a mixture of ethylene carbonate (EC) and diethyl carbonate (DEC) in a volume ratio of 3:7) were used to prepare 2015 standard coin cells.

Electrode Thickness Change after Charge/Discharge

Formation of Electrode

The prepared coin cells were charged with a constant current of 60 mA per 1 g of the active material until reaching 0.001 V relative to the Li electrode. Then, the coin cells were continuously charged at a constant voltage of 0.001 V until decreasing to 7.5 mA per 1 g of the active material.

The completely charged cells were allowed to sit for about 30 minutes, and then discharged with a current of 60 mA per 1 g of the active material until the voltage reached 1.5 V.

Charge/Discharge 17 Times

The prepared coin cells were charged and discharged 17 times in the same conditions as in the third charge/discharge test.

Measurement of Volume Change of Electrode

The thickness of the electrode was measured during the charge/discharge cycles to determine the volume change of the electrode. The thickness of the cross section of the electrode was measured when the electrode was prepared, and after the electrode was charged and discharged twice, 5 times and 17 times. The thicknesses were measured using a micrometer. The results are shown in Table 1 and FIGS. 5 and 6.

TABLE 1

|  | Electrode State | Initial Thickness of Electrode (μm) | Average Thickness before and after the Charge/Discharge (μm) | Thickness Change Rate (%) |
|---|---|---|---|---|
| Example 1 | 2$^{nd}$ Lithiated State | 66 | 139 | 111 |
|  | 2$^{nd}$ Delithiated State | 65 | 114 | 75 |
|  | 5$^{th}$ Lithiated State | 63 | 153 | 143 |
|  | 5$^{th}$ Delithiated State | 63 | 115 | 83 |
|  | 17$^{th}$ Lithiated State | 66 | 142 | 115 |
|  | 17$^{th}$ Delithiated State | 64 | 123 | 92 |
| Example 2 | 2$^{nd}$ Lithiated State | 63 | 155 | 147- |
|  | 2dn Delithiated State | 63 | 105 | 67 |
|  | 5$^{th}$ Lithiated State | 67 | 165 | 146 |
|  | 5$^{th}$ Delithiated State | 64 | 117 | 83 |
|  | 17$^{th}$ Lithiated State | 65 | 146 | 125 |
|  | 17$^{th}$ Delithiated State | 66 | 127 | 92 |
| Example 3 | 2$^{nd}$ Lithiated State | 62 | 135 | 118 |
|  | 2$^{nd}$ Delithiated State | 61 | 108 | 77 |
|  | 5$^{th}$ Lithiated State | 63 | 138 | 119 |
|  | 5$^{th}$ Delithiated State | 62 | 119 | 92 |
|  | 17$^{th}$ Lithiated State | 64 | 142 | 122 |
|  | 17$^{th}$ Delithiated State | 61 | 122 | 100 |
| Example 4 | 2$^{nd}$ Lithiated State | 71 | 107 | 51 |
|  | 2$^{nd}$ Delithiated State | 71 | 104 | 46 |
|  | 5$^{th}$ Lithiated State | 72 | 135 | 88 |
|  | 5$^{th}$ Delithiated State | 73 | 88 | 21 |
|  | 17$^{th}$ Lithiated State | 73 | 107 | 47 |
|  | 17$^{th}$ Delithiated State | 74 | 93 | 26 |
| Comparative Example 2 | 2$^{nd}$ Lithiated State | 59 | 167 | 183 |
|  | 2$^{nd}$ Delithiated State | 59 | 107 | 81 |
|  | 5$^{th}$ Lithiated State | 60 | 157 | 162 |
|  | 5$^{th}$ Delithiated State | 59 | 117 | 98 |
|  | 17$^{th}$ Lithiated State | 59 | 155 | 163 |
|  | 17$^{th}$ Delithiated State | 58 | 124 | 114 |

Charge/Discharge Twice

The prepared coin cells were charged and discharged in the same conditions as in the Formation of Electrode section above.

Charge/Discharge 5 Times

The prepared coin cells were charged and discharged twice in the same conditions as in the Formation of Electrode section above, and charged with a constant current of 150 mA per 1 g of the active material until reaching 0.001 V relative to the Li electrode. Then, the coin cells were continuously charged at a constant voltage of 0.001 V until decreasing to 7.5 mA per 1 g of the active material.

The completely charged cells were allowed to sit for about 30 minutes, and then discharged with a current of 150 mA per 1 g of the active material until the voltage reached 1.5 V. The coin cells were further charged and discharged three times in the same conditions as above.

As shown in Table 1, the thickness changes after the electrode was charged and discharged twice, 5 times and 17 times in Examples 1 through 4 are less than that in Comparative Example 2. The thickness change rate of the electrode after 17 times charge/discharge in Example 4 in which the water-soluble initiator and the crosslinking agent were used was 25%, which is far less than that in Comparative Example 2, which is 114%. The thickness change rates of the electrode after 17 times charge/discharge in Examples 1 to 3 were respectively 92%, 92% and 100% which is improved by 10 to 20% compared to that in Comparative Example 2. In general, since a plurality of electrode layers are loaded into a case when a lithium battery is prepared, a trivial improvement in thickness change rate in one layer as shown in Examples 1 through 3 can contribute a considerable improvement in the battery. Such an enhanced recovery property is a result of the improved elastic force of the crosslinked polyurethane binder. Particularly, the crosslinking effect is remarkable when the crosslinking agent and the water-soluble initiator were used together.

Figure 5:
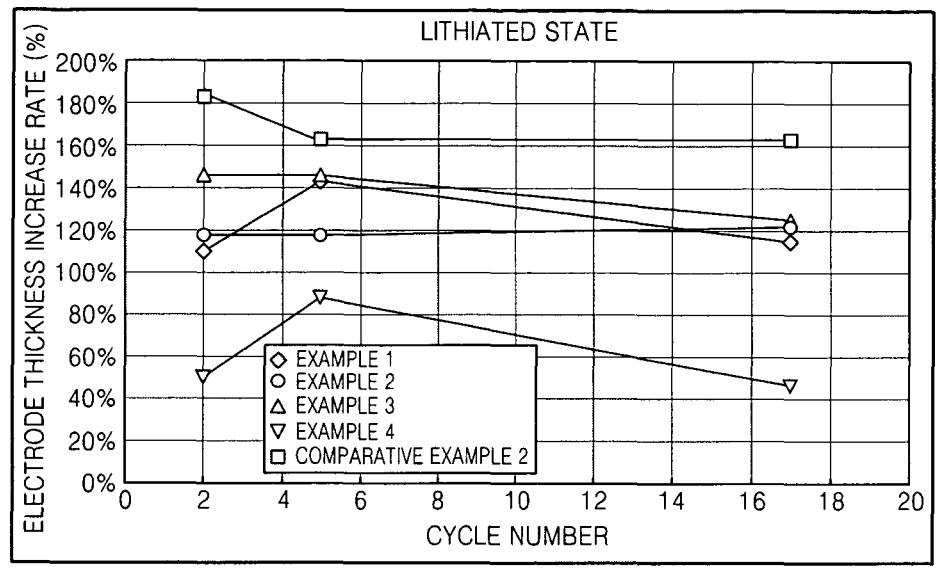
FIG. 5 is a graph illustrating changes in thickness of lithiated electrodes of Examples 1 to 4 and Comparative Example 2.
Figure 6:
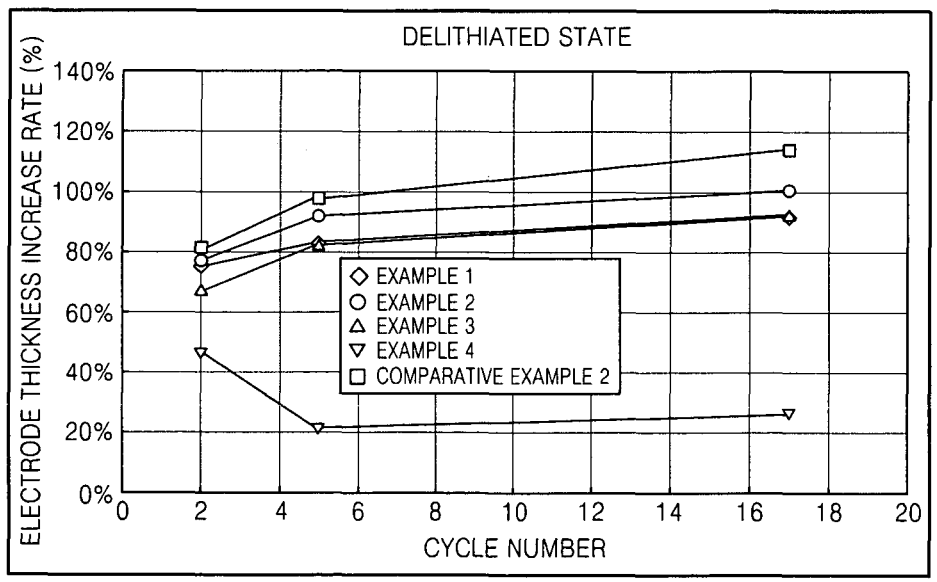
FIG. 6 is a graph illustrating changes in thickness of delithiated electrodes of Examples 1 to 4 and Comparative Example 2.

The results can be identified in FIGS. 5 and 6 which are graphs illustrating thickness changes of the lithiated and delithiated states of electrodes of Examples 1 through 4 and Comparative Example 2. In FIGS. 5 and 6, the thickness change rates of the electrodes in Examples 1 trough 4 were less than that in Comparative Example 2. Particularly, the thickness change rate of the electrode in Example 4 is remarkably low.

A polyurethane binder having double bonds according to the present invention can be dispersed in water with the dispersant including a reactive group such as a carboxyl group, and thus an organic solvent is not required to produce an electrode. Therefore, the manufacturing process for the electrode is environmentally friendly. The polyurethane binder crosslinked by the crosslinking agent, or the water-soluble initiator having a high crosslinking density provides an excellent elastic force and binding force, and thus the electrode and the lithium battery employing the polyurethane binder have improved charge/discharge properties and longer life time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrode for a lithium battery comprising a mixture of an electrode active material and a binder, wherein the binder consists of a thermo-irreversible binder, and a polyurethane binder prepared from a water-soluble initiator and a polyurethane compound having at least one double bond, a urethane main chain, and at least one group capable of forming a cation or anion, the polyurethane compound being obtained by reacting a hydroxyl group-containing compound comprising at least one double bond, a diisocyanate compound, and a dispersant, wherein:

the first hydroxyl group-containing compound comprising at least one double bond is selected from the group consisting of polybutadiene comprising hydroxyl groups at both ends, polyethyleneglycol acrylate comprising a hydroxyl group at one end, polyethyleneglycol methacrylate comprising a hydroxyl group at one end, and combinations thereof, and the diisocyanate compound is selected from the group consisting of methylenephenyldiisocyanate (MDI), polymeric methylenediphenyldiisocyanate (PMDI), tolylenediisocyanate (TDI), lysinediisocyanate (LDI), hydrogenated tolylenediisocyanate hexamethylenediisocyanate (HDI), xylenediisocyanate (XDI), hydrogenated xylenediisocyanate, naphthalenediisocyanate (NDI), biphenylenediisocyanate, 2,4,6-triisopropylphenyldiisocyanate diphenyletherdiisocyanate, tolidinediisocyanate (TODI), isophoronediisocyanate (IPDI), 4,4'-dicyclohexylmethanediisocyanate (HMDI), tetramethylxylenediisocyanate (TMXDI), 2,2,4-trimethylhexamethylenediisocyanate (TMHDI), 1,12-diisocyanatododecan (DDI), norbornanediisocyanate (NBDI), 2,4-bis-(8-isocynatooctyl)-1,3dioctylcyclobutane (OCDI), 2,2,4(2,4,4)-trimethylhexamethylenediisocyanate (TMDI), naphthalene-crosslinked polyphenyl polyisocyanate, and combinations thereof.

2. The electrode of claim 1, wherein the polyurethane binder is prepared by reacting a neutralizer and a chain extender with the polyurethane compound.

3. The electrode of claim 1, wherein the weight average molecular weight (Mw) of the hydroxyl-group containing compound comprising double bonds is in the range of 200 to 10,000.

4. The electrode of claim 1, wherein the dispersant comprises a compound selected from the group consisting of dimethylol butanoic acid, dimethylol propionic acid, methylene diethanol amine, polyethylene oxide derivatives, and combinations thereof.

5. The electrode of claim 1, wherein the amount of the dispersant is in the range of 2 to 7% by weight based on the total weight of the polyurethane binder.

6. The electrode of claim 2, wherein the chain extender comprises a compound selected from the group consisting of ethylenediamine, butylenediamine, propanediamine, hexanediamine, isophoronediamine, xylenediamine, diethyltoluenediamine, diethylenetriamine, triethylenetetraamine, and combinations thereof.

7. The electrode of claim 1, wherein the polyurethane binder is prepared using a crosslinking agent.

8. The electrode of claim 7, wherein the crosslinking agent comprises a compound selected from the group consisting of aziridine, oxazoline, denatured diisocyanate, diepoxide, and combinations thereof.

9. The electrode of claim 1, wherein the water-soluble initiator comprises a compound selected from the group consisting of ammonium persulfate, potassium persulfate, 4,4-azobis(4-cyano valeric acid), 2,2-azobis(2-amidopropane) dihydrochloride, 2,2-azobis[2-(5-methyl-2-imidazoline-2-il) propane] dihydrochloride, 2,2-azobis[2-(2- imidazoline -2-il)propane], 2,2-azobis[2-(2-imidazoline-2-il)propane]dihydrochloride, 2,2-azobis[N-(2-carboxyethyl)-2-methylpropioamide], 2,2-azobis[2-(3,4,5,6-tetrahydropyrimidine-2-il) propane] dihydrochloride, 2,2-azobis{2-[1-(2-hydroethyl)-2-il]propane}dihydrochloride, 2,2-azobis[2-(2- imidazoline-2-il)propane], 2,2-azobis{2-methyl-N-[1,1-bis (hydroxymethy)2-hydroxyethyl]propioamide}, 2,2-azobis{2-methyl-N[2-(hydroxybutyl)]propioamide}, 2,2-azobis{2-methyl-N-[2-(hydroxyethyl)] propioamidel}, and combinations thereof.

10. A lithium battery comprising the electrode of claim 1.

11. A lithium battery comprising:

a first electrode comprising a mixture of an electrode active material and a binder, wherein the binder consists of a thermo-irreversible binder, and a polyurethane binder prepared from a polyurethane compound comprising at least one double bond, a urethane main chain, and at least one group capable of forming a cation or anion, the polyurethane compound being obtained by reacting a hydroxyl group-containing compound comprising at least one double bond, a diisocyanate compound, and a dispersant, wherein:

the hydroxyl group-containing compound comprising at least one double bond is selected from the group consisting of polybutadiene comprising hydroxyl groups at both ends, polyethyleneglycol acrylate comprising a hydroxyl group at one end, polyethyleneglycol methacrylate comprising a hydroxyl group at one end, and combinations thereof, and the diisocyanate compound is selected from the group consisting of methylenephenyldiisocyanate (MDI), polymeric methylenediphenyldiisocyanate (PMDI), tolylenediisocyanate (TDI), lysinediisocyanate (LDI), hydrogenated tolylenediisocyanate, hexamethylenediisocyanate (HDI), xylenediisocyanate (XDI), hydrogenated xylenediisocyanate, naphthalenediisocyanate (NDI), biphenylenediisocyanate, 2,4,6-triisopropylphenyldiisocyanate (TIDI), diphenyletherdiisocyanate, tolidinediisocyanate (TODI), isophoronediisocyanate (IPDI), 4,4'-dicyclohexylmethanediisocyanate HMDI), tetramethylxylenediisocyanate (TMXDI), 2,2,4-trimethylhexamethylenediisocyanate (TMHDI), 1,12-diisocyanatododecan (DDI), norbornanediisocyanate (NBDI), 2,4-bis-(8-isocynatooctyl)-1,3-dioctylcyclobutane (OCDI), 2,2,4(2,4,4)-trimethylhexamethylenediisocyanate (TMDI), naphthalene-crosslinked polyphenyl polyisocyanate, and combinations thereof;
a second electrode; and
a separator.

12. The lithium battery of claim 11, wherein the polyurethane binder is prepared by reacting a neutralizer and a chain extender with the polyurethane compound.

13. The lithium battery of claim 11, wherein the polyurethane binder is prepared using a crosslinking agent or a water-soluble initiator.

14. The electrode of claim 1, wherein the polyurethane binder is uniformly distributed in the electrode.

15. The electrode of claim 1, wherein the mixture of the electrode active material and the binder comprises the polyurethane binder crosslinked in the presence of the electrode active material.

16. The lithium battery of claim 11, wherein the thermo-irreversible binder is carboxy methyl cellulose.

17. The electrode of claim 1, wherein the thermo-irreversible binder is carboxy methyl cellulose.

18. The electrode of claim 1, wherein the hydroxyl-group containing compound comprising double bonds is polybutadiene comprising hydroxyl groups at both ends.

19. An electrode for a lithium battery comprising a mixture of an electrode active material and a binder, wherein the binder consists of a thermo-irreversible binder, and a polyurethane binder prepared from a water-soluble initiator, a polyurethane compound having at least one double bond, a urethane main chain, and at least one group capable of forming a cation or anion, the polyurethane compound being obtained by reacting a first hydroxyl group-containing compound comprising at least one double bond, a second hydroxyl-group containing compound without double bonds and having a Mw in the range of 200 to 10,000, a diisocyanate compound, and a dispersant, wherein:
the first hydroxyl group-containing compound comprising at least one double bond is selected from the group consisting of polybutadiene comprising hydroxyl groups at both ends, polyethyleneglycol acrylate comprising a hydroxyl group at one end, polyethyleneglycol methacrylate comprising a hydroxyl group at one end, and combinations thereof, and
the diisocyanate compound is selected from the group consisting of methylenephenyldiisocyanate (MDI), polymeric methylenediphenyldiisocyanate (PMDI), tolylenediisocyanate (TDI), lysinediisocyanate (LDI), hydrogenated tolylenediisocyanate, hexamethylenediisocyanate (HDI), xylenediisocyanate (XDI), hydrogenated xylenediisocyanate, naphthalenediisocyanate (NDI), biphenylenediisocyanate, 2,4,6-triisopropylphenyldiisocyanate (TIDI), diphenyletherdiisocyanate, tolidinediisocyanate (TODI), isophoronediisocyanate (IPDI), 4,4'-dicyclohexylmethanediisocyanate (HMDI), tetramethylxylenediisocyanate (TMXDI), 2,2,4-trimethylhexamethylenediisocyanate(TMHDI), 1,12-diisocyanatododecan (DDI), norbornanediisocyanate (NBDI), 2,4-bis-(8-isocynatooctyl)-1,3-dioctylcyclobutane (OCDI), 2,2,4(2,4,4)-trimethylhexamethylenediisocyanate (TMDI), naphthalene-crosslinked polyphenyl polyisocyanate, and combinations thereof; and
the second hydroxyl-group containing compound without double bonds is selected from the group consisting of polyethyleneglycol, polypropyleneglycol, ethyleneglycolpropyleneglycol copolymer, polytetramethyleneetherglycol, polycaprolactonediol, polybutadienediol ethyleneglycol, 1,2-propyleneglycol, 1,3-propyleneglycol, 1,3-butanediol, 1,4-butanediol, 1,5-pentanediol,1,6-hexanediol, 2,2-dimethyl-1,3-propanediol, diethyleneglycol, dipropyleneglycol, 1,4-cyclohexanedimethanol, phenyldiethanolamine, methyldiethanolamine, 3,9-bis (2-hydroxy-1,1 -dimethyl)-2,4,8,10-tetraoxaspiro [5,5]-undecane, and combinations thereof.

* * * * *

UNITED STATES PATENT AND TRADEMARK OFFICE
CERTIFICATE OF CORRECTION

PATENT NO. : 8,722,230 B2  
APPLICATION NO. : 11/639635  
DATED : May 13, 2014  
INVENTOR(S) : Seung-Sik Hwang et al.

Page 1 of 2

It is certified that error appears in the above-identified patent and that said Letters Patent is hereby corrected as shown below:

On the Title Page

(56) References Cited, pg. 2, Col. 1, Other Publications, line 10

After "Korean",  
Insert --reference listed in this IDS--

(56) References Cited, pg. 2, Other Publications, Col. 2, line 31

After "2007-016916",  
Insert --noting listed references in this IDS, as well as JP 2002-256129 and 2006-172992, both previously filed in an IDS dated June 3, 2010--

In the Claims

Col. 13, lines 53-54, Claim 1

Delete "tolylenediisocyanate hexamethylenediisocyanate"  
Insert --tolylenediisocyanate, hexamethylenediisocyanate--

Col. 13, lines 56-57 Claim 1

Delete "2,4,6-triisopropylphenyldiisocyanate diphenyletherdiisocyanate",  
Insert --2,4,6-triisopropylphenyldiisocyanate (TIDI), diphenyletherdiisocyanate--

Col. 13, line 63, Claim 1

Delete "2,4-bis-(8-isocynatooctyl)-1,3dioctylcyclobutane",  
Insert --2,4-bis-(8-isocynatooctyl)-1,3-dioctylcyclobutane--

Col. 14, line 40, Claim 9

Delete "hydroxymethy",  
Insert --hydroxymethyl--

Signed and Sealed this  
Second Day of August, 2016

Michelle K. Lee  
*Director of the United States Patent and Trademark Office*

CERTIFICATE OF CORRECTION (continued)
U.S. Pat. No. 8,722,230 B2

| | |
|---|---|
| Col. 14, line 41,<br>Claim 9 | Delete "{2-methyl-N[2-(hydroxybutyl)]",<br>Insert --{2-methyl-N-[2-(hydroxybutyl)]-- |
| Col. 14, line 42,<br>Claim 9 | Delete "propioamidel}",<br>Insert --propioamide}-- |
| Col. 15, line 6,<br>Claim 11 | Delete "HMDI)",<br>Insert --(HMDI)-- |